(12) United States Patent
Kan

(10) Patent No.: US 12,448,745 B2
(45) Date of Patent: Oct. 21, 2025

(54) SELECTIVE ELECTROMAGNETIC DEVICE FOR VEHICLES

(71) Applicant: GM Cruise Holdings LLC, San Francisco, CA (US)

(72) Inventor: Daniel Kan, Atlantic Beach, FL (US)

(73) Assignee: GM Cruise Holdings LLC, San Francisco, CA (US)

( * ) Notice: Subject to any disclaimer, the term of this patent is extended or adjusted under 35 U.S.C. 154(b) by 246 days.

(21) Appl. No.: 17/967,689

(22) Filed: Oct. 17, 2022

(65) Prior Publication Data

US 2024/0125065 A1    Apr. 18, 2024

(51) Int. Cl.
| | |
|---|---|
| *E01H 1/14* | (2006.01) |
| *E01H 1/00* | (2006.01) |
| *H01F 7/06* | (2006.01) |

(52) U.S. Cl.
CPC .............. *E01H 1/14* (2013.01); *E01H 1/005* (2013.01); *H01F 7/064* (2013.01)

(58) Field of Classification Search
None
See application file for complete search history.

(56) References Cited

U.S. PATENT DOCUMENTS

| 3,956,111 | A | 5/1976 | Manfredi | |
|---|---|---|---|---|
| 8,408,601 | B1 | 4/2013 | Miranda | |
| 9,751,482 | B1 | 9/2017 | Brew | |
| 11,066,109 | B1 * | 7/2021 | David | B62D 25/18 |
| 11,105,057 | B2 | 8/2021 | Hopwood | |
| 2017/0252929 | A1 * | 9/2017 | Fukada | B25J 9/1612 |
| 2018/0099703 | A1 * | 4/2018 | Yoon | B62D 37/02 |
| 2018/0251027 | A1 * | 9/2018 | Meinhardt | F16C 32/0442 |
| 2019/0226169 | A1 * | 7/2019 | Hopwood | E01H 1/14 |
| 2021/0072749 | A1 * | 3/2021 | Lacaze | E01H 1/053 |
| 2022/0068535 | A1 * | 3/2022 | Christenson | H02H 9/047 |
| 2023/0241625 | A1 * | 8/2023 | Jenne | B03C 1/284 |
| | | | | 210/222 |
| 2024/0159004 | A1 * | 5/2024 | Maguire | H01F 7/0257 |

FOREIGN PATENT DOCUMENTS

| CN | 110396973 A | * 11/2019 |
|---|---|---|
| KR | 102278708 B1 | * 7/2021 |

OTHER PUBLICATIONS

Translation of CN-110396973-A (Year: 2019).*
Translation of KR-102278708-B1 (Year: 2021).*

* cited by examiner

*Primary Examiner* — Faris S Almatrahi
*Assistant Examiner* — Selena M Jin
(74) *Attorney, Agent, or Firm* — Honigman LLP; Matthew H. Szalach; Jonathan P. O'Brien

(57) ABSTRACT

Systems and methods for a selectively-activated magnetic strip under a vehicle chassis that is powered to pick up nails and other metal debris. The magnetic strip can be selectively activated using an electromagnet powered by the vehicle and controlled by an onboard computer. The magnetic strip can generally be powered on while the vehicle is driving and selectively deactivated based on mapping data to avoid interactions with metallic infrastructure. The magnetic strip can be selectively deactivated based on vehicle parameters, such as vehicle speed.

18 Claims, 10 Drawing Sheets

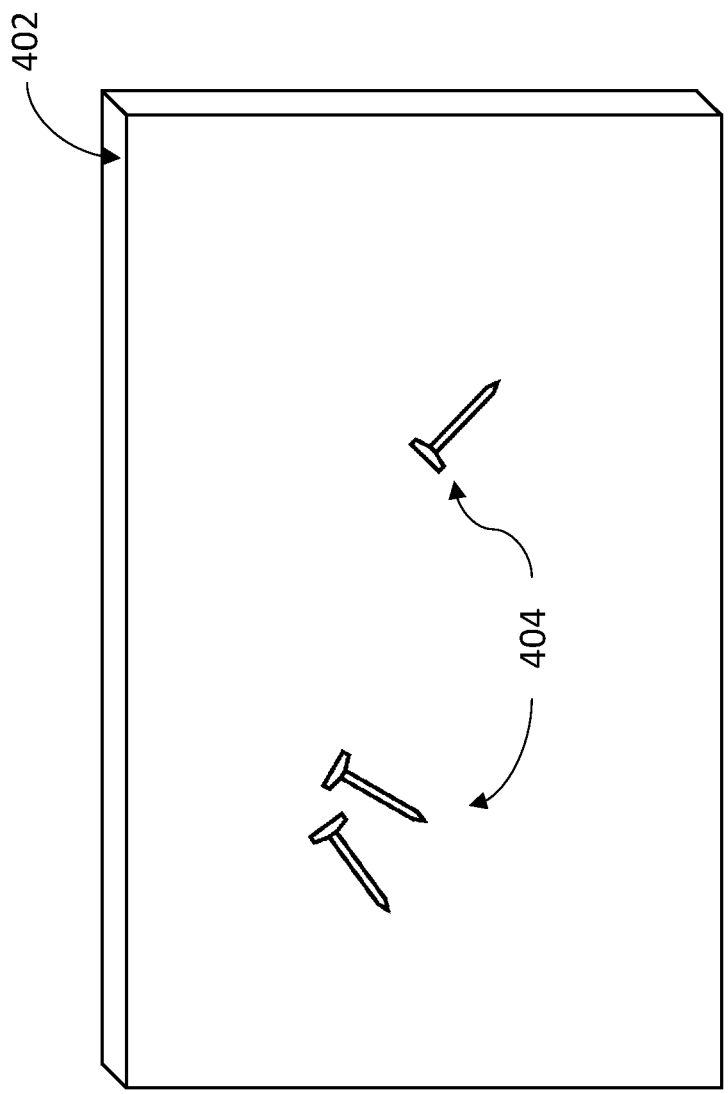

SELECTIVE ELECTROMAGNETIC DEVICE FOR VEHICLES

BACKGROUND

1. Technical Field

The present disclosure generally relates to electromagnetic devices for vehicles and, more specifically, to electromagnetic devices that can be selectively activated.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles. When driving around, autonomous vehicles, like other vehicles, can drive over road debris that can damage the vehicle tires.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 illustrates an example of an electromagnetic device, according to some examples of the present disclosure.

DETAILED DESCRIPTION

Figure 1A:
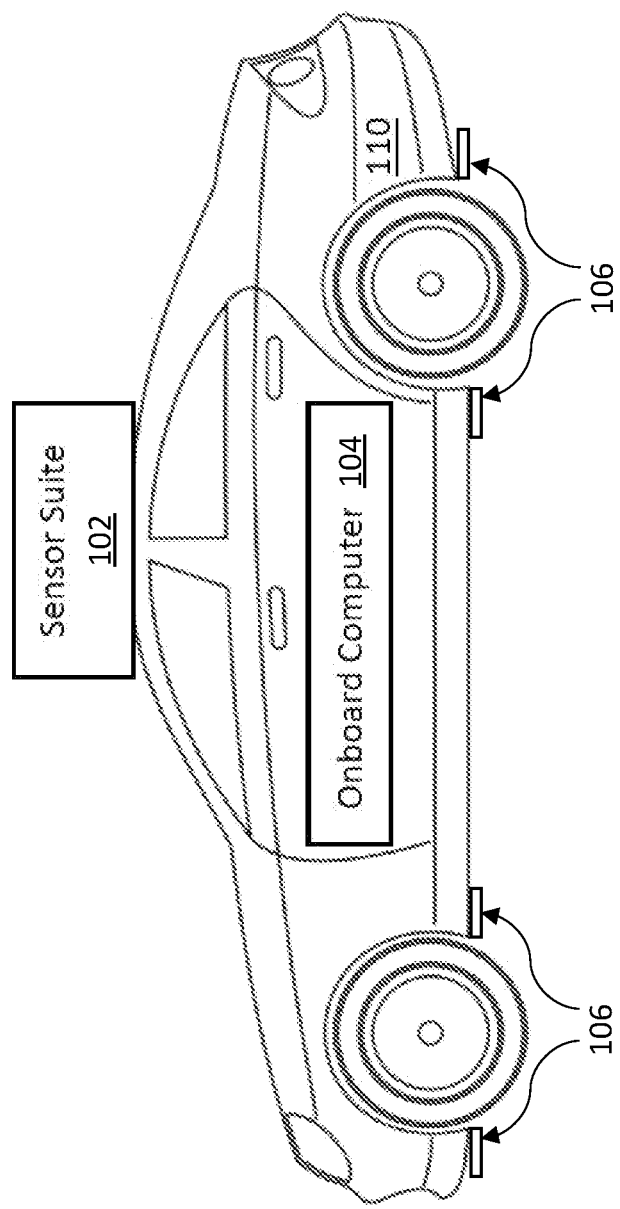
FIGS. 1A-1B illustrate autonomous vehicles having an electromagnetic device, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for a selectively-activated magnetic strip under a vehicle chassis that is powered to pick up nails and other metal debris. The magnetic strip can be selectively activated using an electromagnet powered by the vehicle and controlled by an onboard computer. In some examples, the magnetic strip can generally be powered on while the vehicle is driving and selectively deactivated based on mapping data to avoid interactions with metallic infrastructure. In some examples, the magnetic strip can be selectively deactivated based on vehicle parameters, such as vehicle speed.

Vehicles commonly have issues with running over sharp metallic items on the road, which can damage vehicle tires. Damaged tires can negatively affect vehicle safety and require vehicle maintenance, removing the vehicle from operation. Simply positioning magnets underneath a vehicle floor is not an ideal solution and incurs a number of problems, such as interactions with metal infrastructure (e.g., train tracks) and loss of effectiveness at high speeds.

Systems and methods are provided for a magnetic strip under a vehicle chassis that is selectively activated to pick up nails, screws, and other metal debris from the surface underneath the vehicle. The selectively-activated magnetic strip can be an electromagnet powered by the vehicle. The magnetic strip can generally be powered on while the vehicle is driving and selectively deactivated based on mapping data. For instance, the magnetic strip can be deactivated when a vehicle drives in an area having metal infrastructure such as metal rails and/or drain covers. In some examples, the magnetic strip can be selectively deactivated based on various vehicle parameters, such as vehicle speed. For example, if the vehicle is traveling above a selected threshold speed, the magnet can be deactivated since it would no longer be effective to lift objects before running over the objects. In another example, the magnetic strength can be increased or decreased based on vehicle speed to maximize the efficiency of the magnetic strip in picking up loose metallic objects. The magnetic strip discussed herein can include multiple magnetic strips and it can include multiple electromagnets and/or electropermanent magnets.

The magnetic strip can be selectively activated and deactivated while a vehicle is driving. However, if the magnetic strip has picked up an object, it may be undesirable to deactivate the magnetic strip and allow the object to fall back to the ground. In some implementations, the systems and methods discussed herein includes determining whether an object is coupled with the magnetic strip, such as by detecting changes in weight of the strip, evaluating image data, evaluating pressure sensor data, etc. If an object was picked up and is coupled to the magnetic strip, the magnetic system may not turn off when it otherwise would have, and the magnetic system may instead decrease magnetic strength of the magnetic strip. In some examples, less magnetic power is needed to maintain the magnetic coupling with the object than is used to initially pick up the object. Thus, if the vehicle exceeds a selected threshold speed at which the magnetic strip is no longer effective to pick up objects, the magnetic strip may nevertheless remain activated to maintain its hold on a metallic object coupled to the magnetic strip. In some examples, when an object is detected coupled to the magnetic strip, a vehicle may route to avoid geographical areas that include magnetic strip deactivation criteria (e.g., areas with metallic infrastructure, or areas where the vehicle speed exceeds a threshold).

In various implementations, vehicles in a vehicle fleet can identify where metallic infrastructure exists and update vehicle fleet map data accordingly. The magnetic system can detect large metallic objects in the environment and transmit data regarding metallic objects to an onboard localization and mapping system. The onboard localization and mapping system can send mapping data to a backend server. Additionally, individual vehicles may detect where metallic objects were picked up and store object pick-up as event data. The vehicle fleet can aggregate the metallic object pick-up event data to determine zones in which there is an increased likelihood of encountering tire-damaging road debris. An increased likelihood of tire-damaging road debris can influence future routing and route weighting.

FIG. 1A illustrates an autonomous vehicle 110 having an electromagnetic device 106 underneath the vehicle 110 that is configured to pick up nails, screws, and other metallic debris from underneath the vehicle 110, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 can connect with a central computer to download vehicle updates, maps, and other vehicle data. The electromagnetic device 106 includes one or more magnetic strips positioned in front of the tires, as well as, in some examples, additional magnetic strips positioned behind the tires. The magnetic strips can be selectively activated. In some examples, the onboard computer 104 can activate and/or deactivate the electromagnetic device 106. In some examples, the onboard computer 104 can activate and/or deactivate individual magnetic strips and/or parts of each individual magnetic strip of the electromagnetic device 106.

The sensor suite 102 includes localization and driving sensors. For example, the sensor suite 102 may include one or more of photodetectors, cameras, radio detection and ranging (RADAR), sound navigation and ranging (SONAR), light detection and ranging (LIDAR), Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items, such as areas with high quantities of road debris, and/or areas with metal infrastructure. Additionally, sensor suite 102 data can provide localized traffic information, ongoing roadwork information, and current road condition information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. The onboard computer 104 can activate and deactivate the electromagnetic device 106. In some examples, the onboard computer 104 checks for vehicle updates from a central computer or other secure access point. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1A functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 1B:
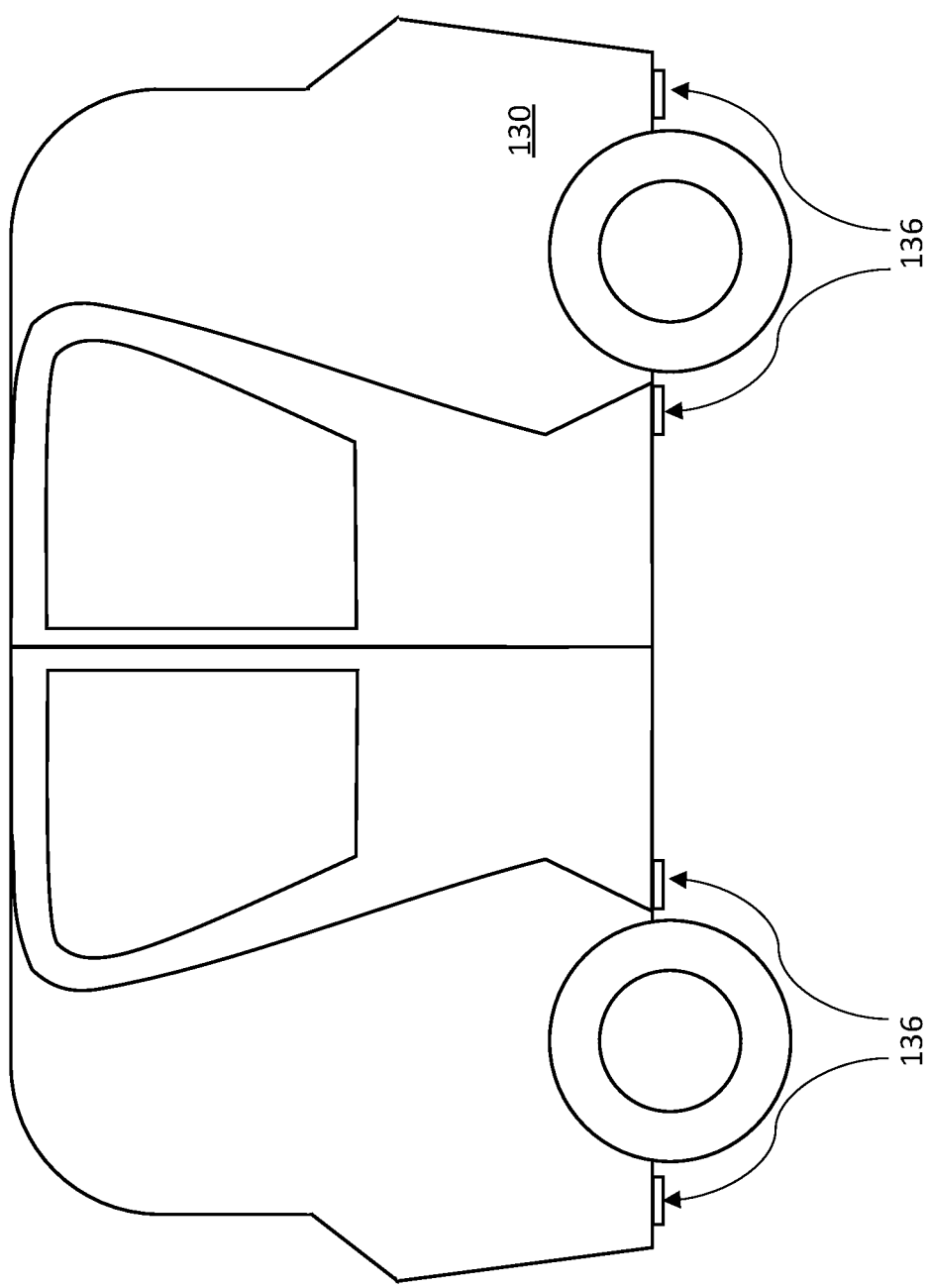

FIG. 1B is an example 120 illustrating another autonomous vehicle 130 having an electromagnetic device 136, according to some examples of the present disclosure. In some examples, the autonomous vehicle 130 does not include a driver's seat, and can drive in either direction (i.e., there is no predetermined front or back of the vehicle 130). In various examples, the electromagnetic device 136 is substantially the same as the electromagnetic device 106 of FIG. 1A. The autonomous vehicle 130 includes an onboard computer (not shown), as well as a sensor suite. In some implementations, the sensor suite on the autonomous vehicle 130 includes several components positioned on top of the autonomous vehicle 130. In some examples, the sensor suite includes a component positioned at each of the four top corners of the vehicle 130 (e.g., top front right corner, the top front left corner, the top back right corner, and the top back left corner), such that the four components comprise the sensor suite. The electromagnetic device 136 includes one or more magnetic strips positioned in front of the tires, as well as, in some examples, additional magnetic strips positioned behind the tires. The magnetic strips can be selectively activated. In some examples, the onboard computer can activate and/or deactivate the electromagnetic device 136. In some examples, the onboard computer can activate and/or deactivate individual magnetic strips and/or parts of each individual magnetic strip of the electromagnetic device 136.

Figure 2A:
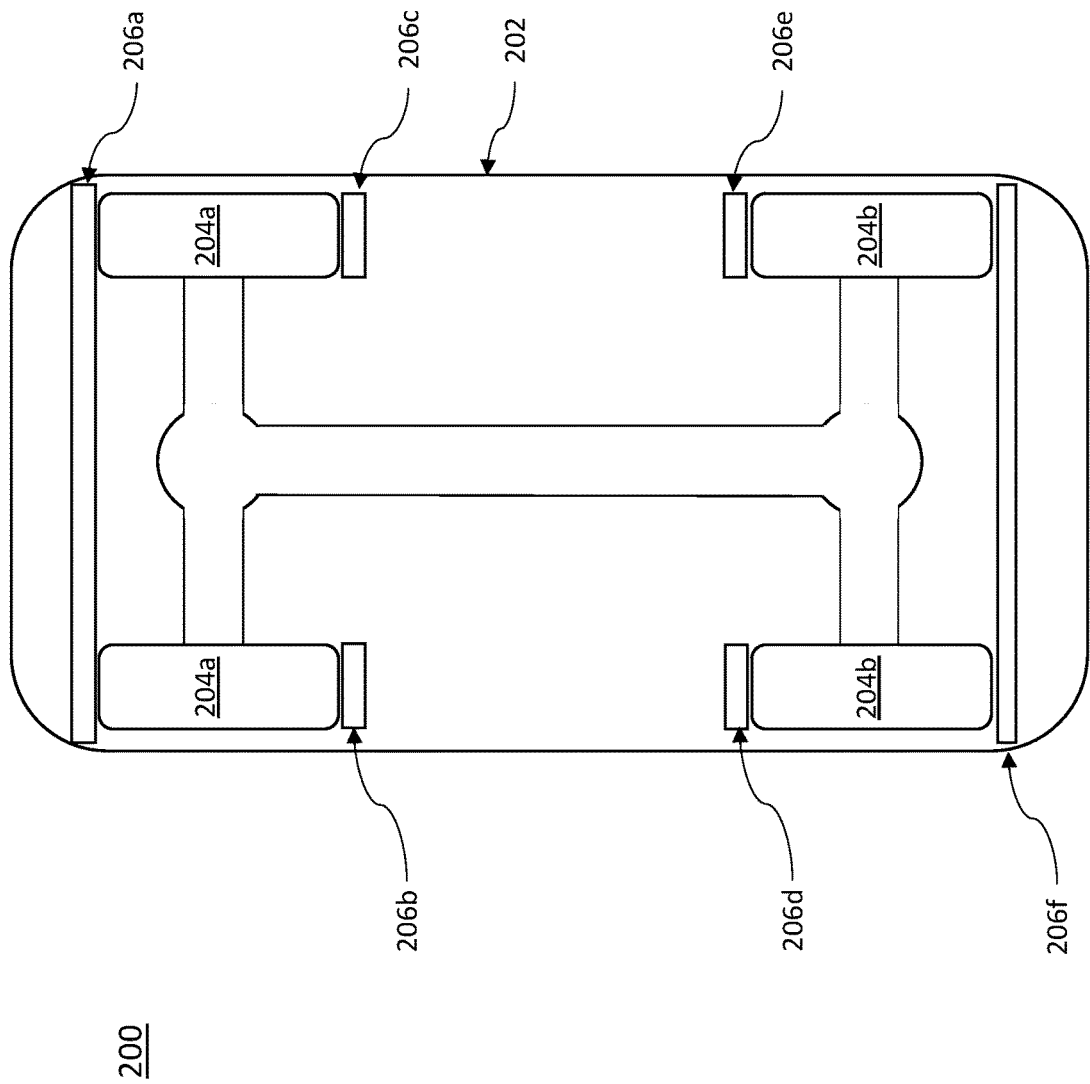
FIGS. 2A-2B illustrate bottom views of vehicles having an electromagnetic device, according to some examples of the present disclosure.

FIG. 2A shows a bottom view 200 of a vehicle having an electromagnetic device, according to some examples of the present disclosure. The bottom view 200 shows the vehicle chassis 202, the tires 204a, 204b, and magnetic strips 206a-206f of the electromagnetic device. As shown in FIG. 2A, the electromagnetic device includes a long magnetic strip 206a in front of the front tires 204a of the vehicle that has a substantially similar width to the width of the vehicle chassis 202. In some examples, the magnetic strip 206a is positioned under the vehicle front bumper.

In various examples, the electromagnetic device includes multiple magnetic strips 206a-206f. In one example, the electromagnetic device includes a second long magnetic strip 206f behind the back tires 204b that has a substantially similar width to the width of the vehicle chassis 202. In some examples, the magnetic strip 206a is positioned under the vehicle back bumper. In some examples, the vehicle can drive in either direction, such that the designation of the front tires 204a as "front" and the designation of the back tires 204b as "back" is arbitrary.

In further examples, the vehicle includes magnetic strips 206b, 206c behind each of the front 204a tires. The magnetic strips 206b, 206c can be about the same width as the front tires 204a, and the magnetic strips 206b, 206c can have a larger width than the front tires 204a. Similarly, the vehicle can include magnetic strips 206d, 206e in front of the back tires 204b. The magnetic strips 206d, 206e can be about the same width as the back tires 204b, and the magnetic strips 206d, 206e can have a larger width than the back tires 204b. In some examples, one or more of the magnetic strips 206b-206e can have a width that is substantially similar to the width of the vehicle chassis. In some examples, the vehicle includes only a subset of the magnetic strips 206a-206f. For instance, the vehicle may include only magnetic strip 206a, only magnetic strip 206f, or only magnetic strips 206a and 206f. In general, any combination of magnetic strips 206a-206f is possible.

According to various implementations, each of the magnetic strips 206a-206f can be individually activated and/or deactivated. In some examples, a vehicle onboard computer can activate and/or deactivate each magnetic strip. In some examples, a central computer can transmit magnetic strength instructions for changing the magnetic strength of one or more magnetic strips. In some examples, the strength of each magnetic strip can be changed, such that an activated magnetic strip can have various magnetic strengths. For instance, a magnetic strip can have a strength of 500 Gauss, 1000 Gauss, 2000 Gauss, 3000 Gauss, 4000 Gauss, 5000 Gauss, or more than 5000 Gauss. In one example, a magnetic strip can be set to a strength of 5000 Gauss to attract nails, screws, and other metallic debris, and the magnetic strength can be decreased to 1000 Gauss to maintain the metallic debris already on the strip but not attract further debris for pick up. In some examples, the magnetic strength can be different for different magnetic strips 206a-206f, such that a first magnetic strip 206a can have a different strength from a second magnetic strip 206b. Additionally, within a single magnetic strip, the magnetic strength of different portions of the strip can vary, such that a first portion of a magnetic strip has a different strength from a second portion of the magnetic strip.

In some implementations, the magnetic strength of one or more magnetic strips 206a-206f is adjusted based on map data. In particular, map data can include data with locations of metallic infrastructure, such as municipal lines, manhole covers, rail tracks, etc. Additionally, map data can indicate areas with increased road debris. In some examples, when map data indicates that an area has metallic infrastructure, the magnetic strips on a vehicle will be deactivated or weakened to a decreased strength level to avoid any potential interactions between the vehicle magnetic strips and the metallic infrastructure.

Figure 2B:
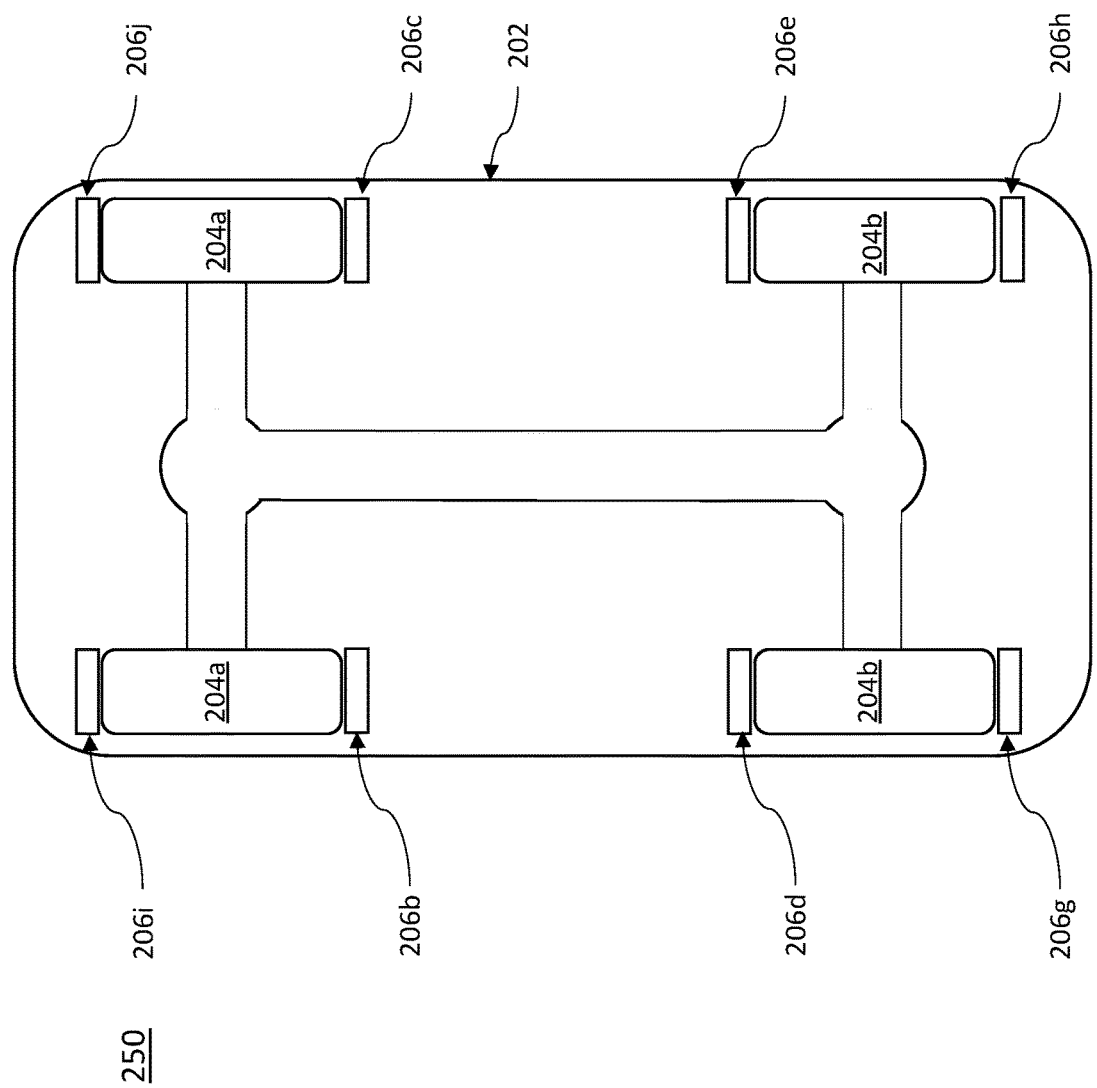

FIG. 2B shows a bottom view 250 of a vehicle having an electromagnetic device, according to some examples of the present disclosure. The bottom view 250 shows the vehicle chassis 202, the tires 204a, 204b, and magnetic strips 206b, 206c, 206d, 206e, 206g, 206h, 206i, 206j of the electromagnetic device. As shown in FIG. 2B, the electromagnetic device includes shorter magnetic strips 206i, 206j in front of each of the front tires 204a of the vehicle. In some examples, each of the magnetic strips 206i, 206j has a width similar to the width of the front tires 204a. In some examples, each of the magnetic strips 206i, 206j has a larger width than the width of the front tires 204a. In some examples, the magnetic strips 206i, 206j are positioned under the vehicle front bumper.

In various examples, the electromagnetic device includes multiple magnetic strips 206b, 206c, 206d, 206e, 206g, 206h, 206i, 206j. In one example, the electromagnetic device includes shorter magnetic strips 206g, 206h behind each of the back tires 204b of the vehicle. In some examples, each of the magnetic strips 206g, 206h has a width similar to the width of the back tires 204b. In some examples, each of the magnetic strips 206g, 206h has a larger width than the width of the back tires 204b. In some examples, the magnetic strips 206g, 206h are positioned under the vehicle back bumper. In some examples, the vehicle can drive in either direction, such that the designation of the front tires 204a as "front" and the designation of the back tires 204b as "back" is arbitrary. In some examples, the vehicle includes only a subset of the magnetic strips 206b, 206c, 206d, 206e, 206g, 206h, 206i, 206j. For instance, the vehicle may include only magnetic strips 206i, 206j, only magnetic strips 206g, 206h, or only magnetic strips 206i, 206j, 206b, and 206c. In general, any combination of magnetic strips 206b, 206c, 206d, 206e, 206g, 206h, 206i, 206j is possible.

As discussed above with respect to FIG. 2A, each of the magnetic strips 206b, 206c, 206d, 206e, 206g, 206h, 206i, 206j can be individually activated and/or deactivated. Similarly, the strength of each magnetic strip 206b, 206c, 206d, 206e, 206g, 206h, 206i, 206j can be changed, such that an activated magnetic strip can have various magnetic strengths. Additionally, within a single magnetic strip 206b, 206c, 206d, 206e, 206g, 206h, 206i, 206j, the magnetic strength of different portions of the strip can vary, such that a first portion of a magnetic strip 206b, 206c, 206d, 206e, 206g, 206h, 206i, 206j has a different strength from a second portion of the magnetic strip 206b, 206c, 206d, 206e, 206g, 206h, 206i, 206j.

Figure 3A:
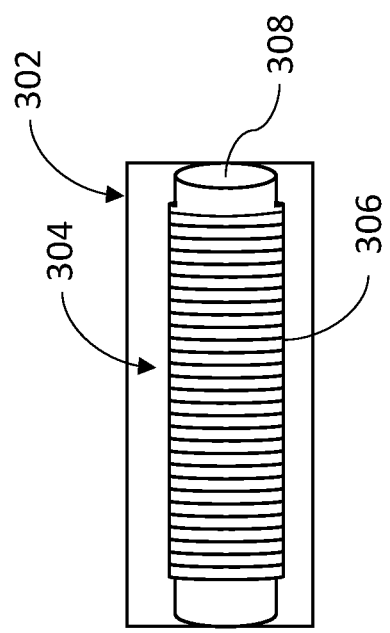
FIG. 3A illustrates an example of an electromagnet for an electromagnetic device for vehicles, according to some examples of the present disclosure.

FIG. 3A illustrates an example 300 of an electromagnet 304 for an electromagnetic device for vehicles, according to some examples of the present disclosure. In some examples, a magnetic strip 302 can include one or more electromagnets 304. As shown in FIG. 3A, the electromagnet 304 includes a coil of wire 306 wrapped around a core 308. The core 308 is magnetic and manufactured from a ferromagnetic (or ferrimagnetic) material such as iron. In some examples, the core 308 concentrates the magnetic flux resulting in a more powerful magnetic strength when the electromagnet is activated. The electromagnet 304 can be activated by applying a current to the coil of wire 306. In various examples, an onboard computer and a vehicle battery can be used to apply the current to the coil. Furthermore, the strength of the current applied to the coil can be used to adjust the magnetic strength of the electromagnet. A higher current results in a stronger magnetic strength (i.e., a higher magnetic flux density and higher Gauss measurement). A weaker current results in a weaker magnetic strength (i.e., a lower magnetic flux density and lower Gauss measurement). When no current is applied to the electromagnet, the electromagnet is deactivated and the magnetic strength of the electromagnet is close to zero.

Figure 3B:
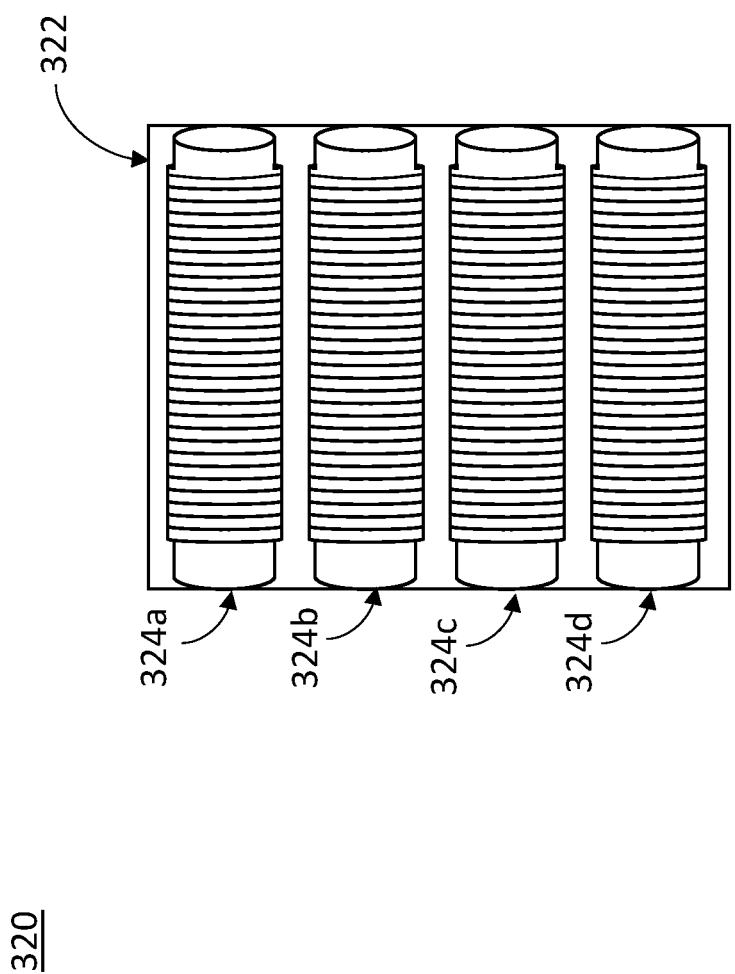
FIG. 3B illustrates an example of an electromagnetic device (such as a magnetic strip) having a multiple electromagnets, according to some examples of the present disclosure

FIG. 3B illustrates an example 320 of an electromagnetic device 322 (such as a magnetic strip) having a multiple electromagnets 324a, 324b, 324c, 324d, according to some examples of the present disclosure. The electromagnets 324a, 324b, 324c, 324d can be substantially similar to the electromagnet 304 of FIG. 3A. In some examples, the strength of each of the electromagnets 324a, 324b, 324c, 324d can be individually adjusted to adjust the strength of various portions of the electromagnetic device 322. Similarly, each of the electromagnets 324a, 324b, 324c, 324d can be turned on or off individually to turn on and/or off various portions of the electromagnetic device 322.

In some examples, an electropermanent magnet is used in the electromagnetic device for vehicles described herein. An electropermanent magnet is similar to an electromagnet in that the external magnetic field can be switched on or off using a pulse of electric current in a wire coiled around part of the magnet. An electropermanent magnet includes two sections: a first section having a hard magnetic material with high coercivity and a second section having a soft material having low coercivity. There is a wire winding around the first section, and the direction of magnetization in the second section can be switched using a pulse of current in the wire winding about the first section. When the first and second sections have opposing magnetizations, an electropermanent magnet produces no net external field across its poles. When the direction of magnetization of the first and second sections is aligned, an electropermanent magnet produces an external magnetic field. An electropermanent magnet can maintain its magnetic field without a constant power source.

FIG. 4 illustrates an example 400 of an electromagnetic device, according to some examples of the present disclosure. The electromagnetic device 400 includes a magnetic strip 402 as described above with respect to FIGS. 1A, 1B, 2A, 2B, 3A, and 3B. The magnetic strip 402 may be disposed on the underside of a vehicle, for example, in front of the tires and/or under the bumpers. When the magnetic strip 402 is activated, it attracts metallic debris from the surface under the vehicle. Thus, for instance, the magnetic strip 402 can attract nails and screws from a road before the vehicle drives over them, protecting the vehicle tires from potential damage. As shown in FIG. 4, the magnetic strip 402 has attracted three nails 404, which are magnetically stuck to the magnetic strip 402.

Figure 5:
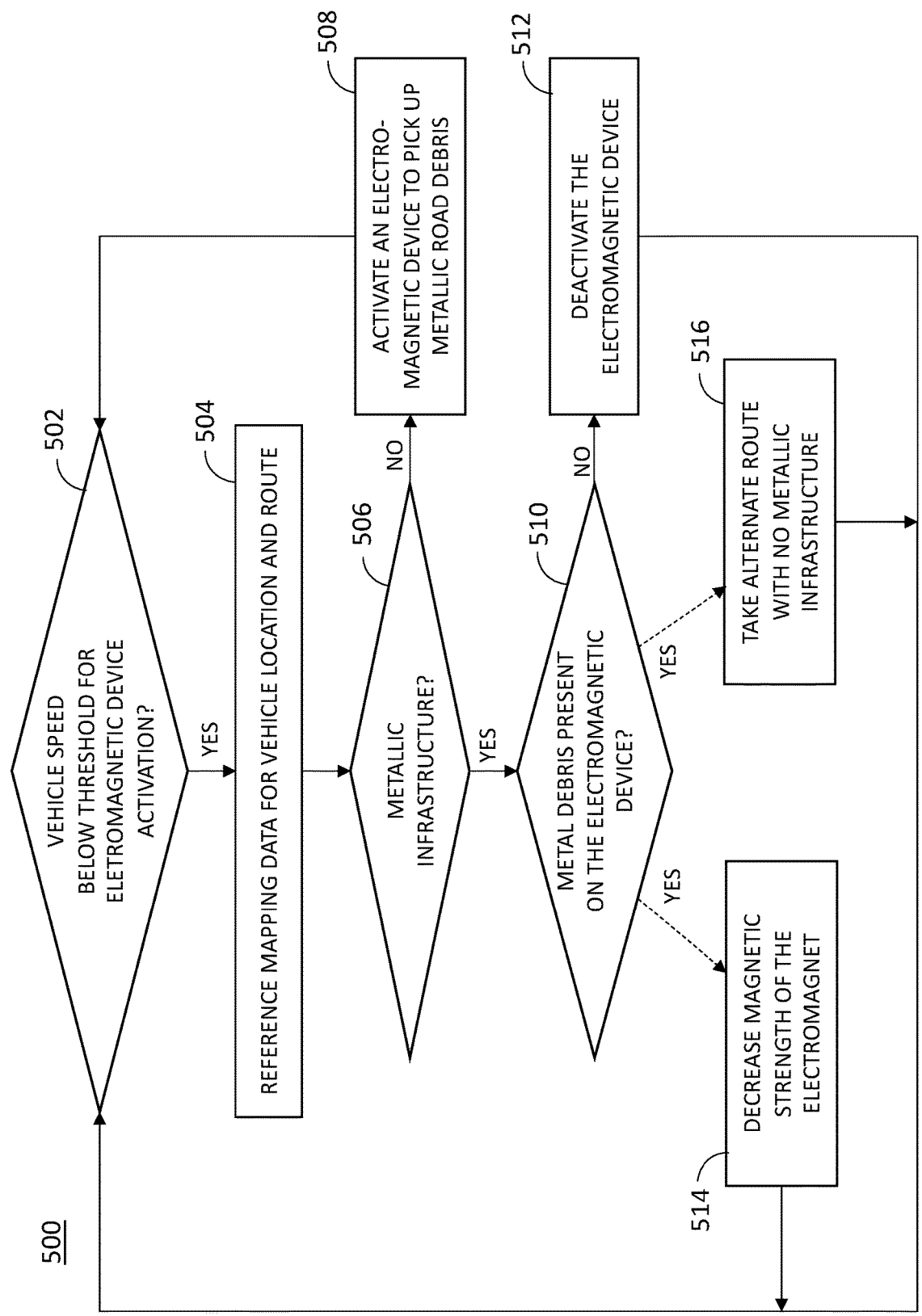
FIG. 5 is a flowchart illustrating a method for an electromagnetic device for vehicles, according to some examples of the present disclosure.

FIG. 5 is a flowchart illustrating a method 500 for an electromagnetic device for vehicles, according to some examples of the present disclosure. The method 500 can be followed for determination of activation and deactivation of a vehicle electromagnetic device, such as the electromagnetic device described above with respect to FIGS. 1A, 1B, 2A, 2B, 3A, and 3B. At step 502, it is determined whether the vehicle speed is below a threshold for electromagnetic device activation. In particular, when a vehicle's speed is above a selected threshold, the electromagnetic device will no longer function to attract metallic debris off a roadway before a vehicle tire drives over the debris. Thus, if the vehicle speed is not below the threshold, the method 500 stops at step 502. In various examples, the method 500 returns to step 502 periodically to check if vehicle speed is below the threshold. In various examples, the method 500 repeats step 502 every second, every five seconds, every ten seconds, or more than every ten seconds. In some examples, when the vehicle is driving at a speed above the threshold, the method 500 is triggered to begin when vehicle speed decreases below the threshold. In some examples, the method 500 begins at a selected point along the vehicle route. For instance, the method 500 may being when a vehicle exits a highway.

If, at step 502, the vehicle speed is below the threshold for electromagnetic device activation, at step 504, mapping data for the vehicle location and the vehicle route is referenced. In particular, mapping data for the current vehicle location is accessed and checked for relevant information such as data on metallic infrastructure, municipal lines, presence of road debris, and other information. Additionally, mapping data for upcoming vehicle locations and/or for the vehicle route can be accessed and checked at step 504. Mapping data for upcoming vehicle locations can include vehicle locations for a selected distance according to the vehicle route, such as mapping data for the upcoming next ten meters, the next 20 meters, the next 50 meters, or the next 100 meters.

At step 506, it is determined whether the current location and/or upcoming locations include metallic infrastructure. Metallic infrastructure can include rail lines, tram lines, manhole covers, selected municipal lines, as well as other structures. Additionally, road work or other construction can include temporary metallic structures such as metallic road grates, metal road hole covers, metal warning signs, and other structures. According to various examples, autonomous vehicle mapping data includes information about various types of metal structures along a roadways that a magnetic system, such as the electromagnetic device discussed herein, can attract.

In some examples, at step 506, if the current location does not include metallic infrastructure, the method 500 proceeds to step 508 and an electromagnetic device on the vehicle is activated to pick up metallic debris. In some examples, at step 506, if the current location and upcoming locations within a selected distance do not include metallic infrastructure, the method 500 proceeds to step 508 and an electromagnetic device on the vehicle is activated to pick up metallic debris. In various examples, the selected distance is five feet, ten feet, twenty-five feet, fifty feet, or more than fifty feet. In some examples, the current location can include the roadway directly underneath the vehicle. In some examples, the current location can include the roadway directly underneath the vehicle as well as the roadway a selected distance around the vehicle. In some examples, the current location can include the roadway directly underneath the vehicle as well as the roadway a selected distance in front of the vehicle, such as one foot, two feet, or three feet in front of the vehicle.

In some examples, the method 500 proceeds from step 508 back to step 502, and continues to monitor the vehicle speed (at step 502), reference mapping data (at step 504), and monitor for metallic infrastructure on the roadway (at step 506) while the electromagnetic device is activated. Thus, at step 506, if it is determined that the current location and/or upcoming locations include metallic infrastructure, before the electromagnetic device is deactivated, the method first proceeds to step 510 to determine whether the electromagnetic device has already attracted any metallic debris. If metallic debris such as nails and/or screws are already attached to the electromagnetic device, deactivating the device can cause the debris to fall onto the roadway in front of the tires.

At step 510, if there is no metallic debris present on the electromagnetic device, the method 500 proceeds to step 512, and the electromagnetic device is deactivated. Deactivating the electromagnetic device at step 512 prevents the device from interacting with (i.e., being magnetically attracted to) the metallic infrastructure. However, if, at step 510, it is determined that there is metallic debris present on the electromagnetic device, the method 500 proceeds to one of steps 514 and 516. At step 514, the magnetic strength of the electromagnetic device is decreased to a level that is not strong enough to pick up new metallic debris from the roadway, but allows the metallic debris already on the electromagnetic device to remain magnetically attached to the electromagnetic device. In some examples, at step 514, the magnetic strength of the electromagnetic device is decreased to a level that prevents attraction between the vehicle and the metallic infrastructure. In some examples, at step 514, the magnetic strength of the electromagnetic device is decreased to a level that prevents noticeable attraction between the vehicle and the metallic infrastructure. After step 514, the method 500 returns to step 502 and determines when the electromagnetic device can be reactivated at step 508.

In some examples, at step 510, if it is determined that there is metallic debris present on the electromagnetic device, the method 500 proceeds to step 516, identifies an alternate route with no metallic infrastructure, and routes the vehicle to the alternate route. In this example, the electromagnetic device remains activated, and the vehicle avoids the metallic infrastructure. In some examples, step 516 includes identifying a route with less metallic infrastructure. After step 516, the method 500 returns to step 502, and continues to monitor for metallic infrastructure.

In some implementations, the electromagnetic device for the vehicle is an apparatus that includes a module for dropping the debris to clear the electromagnetic device of debris. The apparatus can include a moveable basket that can move into place beneath the electromagnetic device such that when the electromagnetic device is deactivated, the debris falls into the basket. The basket can subsequently be moved out of the way, allowing the electromagnetic device to be reactivated and collect more debris.

In some implementations, there are various locations for the vehicle to drop any collected metallic debris. For example, the vehicle can drop collected metallic debris at a service center. In another example, a charging station can include a debris collection area, such as an elongated cavity that is positioned under the electromagnetic device when the vehicle is parked for charging. In some instances, the cavity can be configured with a removable cover that can automatically draw back for debris collection and subsequently cover the cavity again. In some examples, the cavity can be covered with a grate that allows metallic debris to fall through the holes. When the vehicle is parked such that the electromagnetic device is positioned over a debris collection cavity, the electromagnet can be deactivated, causing the debris to fall off the electromagnetic device into the cavity.

Figure 6:
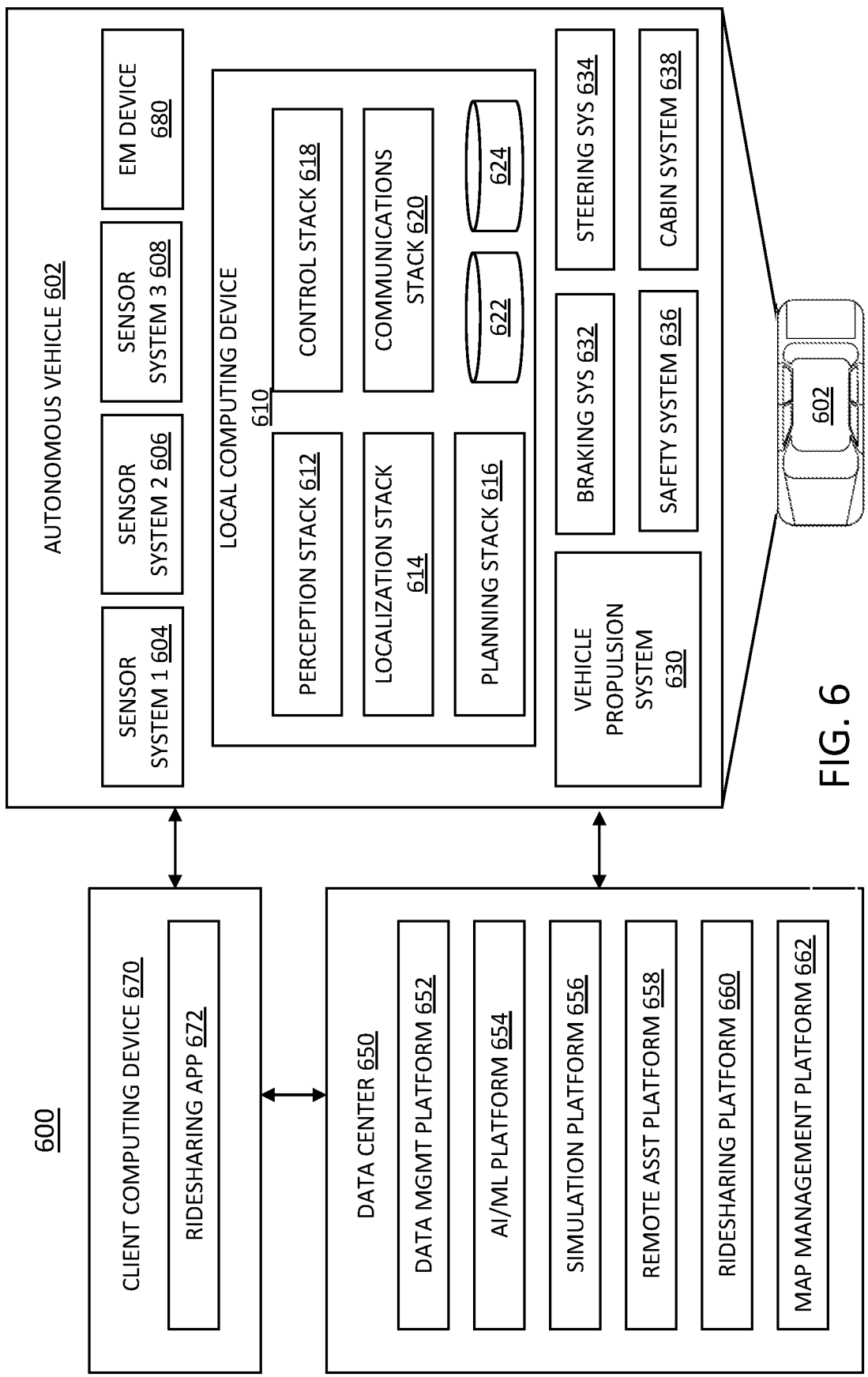
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, SONAR systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

The AV 602 includes an electromagnetic device 680 as described above. The electromagnetic device 680 includes one or more selectively-activated magnetic strips positioned underneath the vehicle. The local computing device 610 can activate the electromagnetic device 680 and the local computing device 610 can deactivate the electromagnetic device 680. In various examples, the electromagnetic device 680 includes a plurality of electromagnets, and receives power from a vehicle battery. Activating the electromagnetic device 680 can include turning on (or connecting) the power to one or more of the electromagnets. Deactivating the electromagnetic device 680 can include turning off (or disconnecting) the power to one or more of the electromagnets.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 5 and elsewhere in the present disclosure.

The data center 650 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some examples, the map management platform 662 includes data on metallic infrastructure along various roadways and in any locations the AV 602 may drive. In various examples, the local computing device 610 receives map data from the map management platform 662, including metallic infrastructure data. The local computing device 610 can activate, deactivate, and/or adjust the magnetic strength of one or more portions of the electromagnetic device 680 based on the map data.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
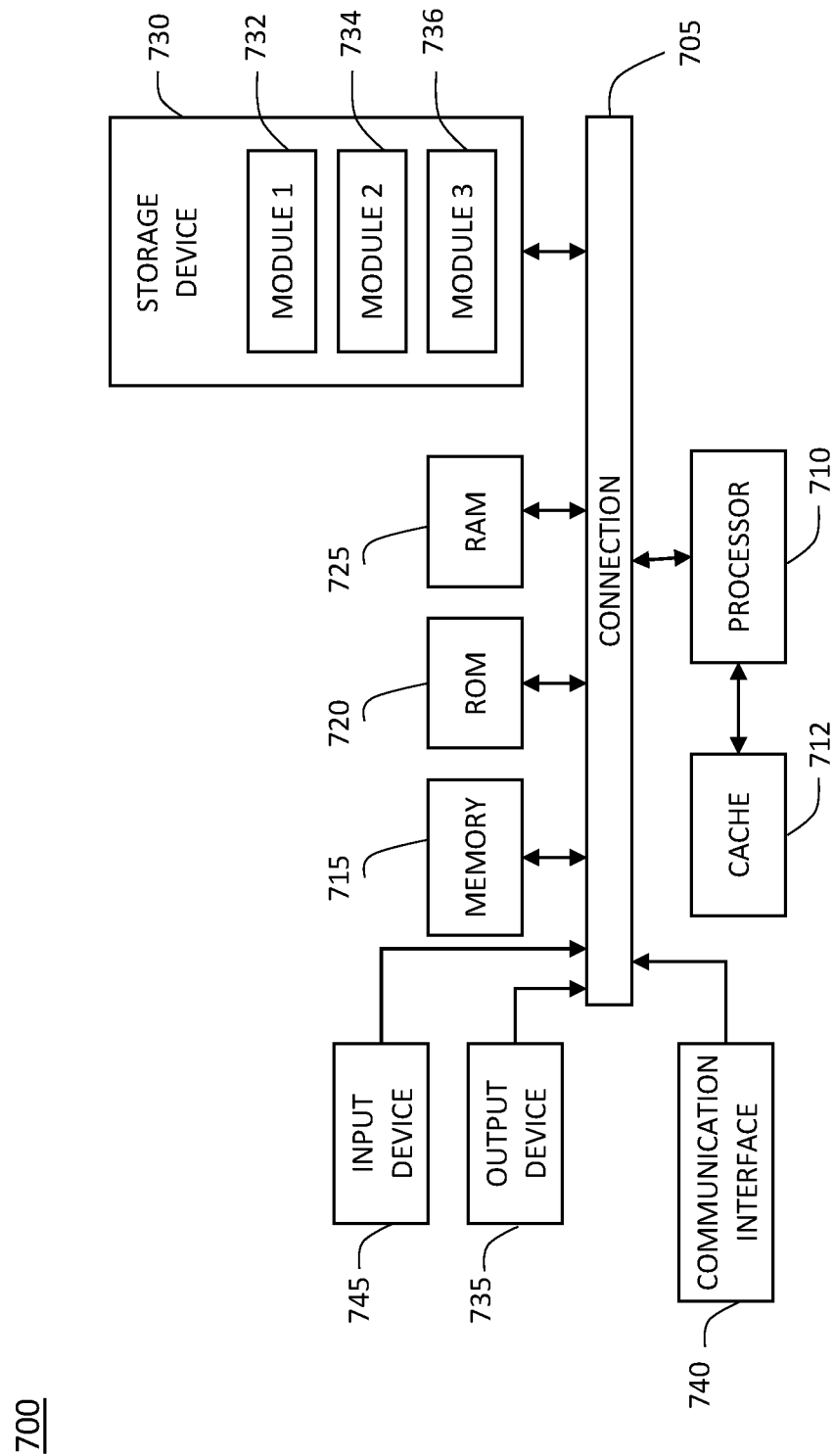
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an (BEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more GNSS receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASH EPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a system for a vehicle to collect metallic road debris, comprising: an autonomous vehicle, including: a magnetic strip positioned under a vehicle chassis, wherein: in a first mode, the magnetic strip is activated, in a second mode, the magnetic strip is deactivated, and wherein when the magnetic strip is in a first mode, the magnetic strip attracts metallic objects from under the vehicle; a sensor system to detect an item on the magnetic strip; and an onboard computer to control the magnetic strip, wherein the onboard computer is to activate and deactivate the magnetic strip; and a central computing system to communicate map data to the onboard computer, wherein the map data includes metallic infrastructure information.

Example 2 provides a method, system, and/or vehicle according to one or more of the preceding and/or following examples, wherein the onboard computer is to activate and deactivate the magnetic strip based on the map data.

Example 3 provides a method, system, and/or vehicle according to one or more of the preceding and/or following examples, wherein the onboard computer is to activate and deactivate the magnetic strip based on vehicle speed.

Example 4 provides a method, system, and/or vehicle according to one or more of the preceding and/or following examples, wherein the first mode is a fully activated mode and wherein the magnetic strip is further to operate in a third mode, wherein in the third mode the magnetic strip is weakly activated, maintains attachment with magnetically attached metallic objects, and fails to attract additional metallic objects from under the vehicle.

Example 5 provides a method, system, and/or vehicle according to one or more of the preceding and/or following examples, wherein the onboard computer is to receive detected item information from the sensor system.

Example 6 provides a method, system, and/or vehicle according to one or more of the preceding and/or following examples, wherein the magnetic strip includes a plurality of electromagnets for providing magnetic strength to a corresponding plurality of portions of the magnetic strip, and wherein the onboard computer is to activate and deactivate the portions of the magnetic strip by activating and deactivating corresponding electromagnets of the plurality of electromagnets.

Example 7 provides a method, system, and/or vehicle according to one or more of the preceding and/or following examples, wherein the autonomous vehicle further comprises a battery, wherein the magnetic strip includes an electromagnet, and wherein the battery provides power to the electromagnet in the first mode, when the magnetic strip is activated.

Example 8 provides a method for a vehicle to collect metallic road debris, comprising: determining that a vehicle speed is below a selected threshold; receiving first map data for a first vehicle location; determining that there is no metallic infrastructure at the first vehicle location; and at the first vehicle location, activating an electromagnetic device attached to the vehicle to attract metallic objects from under the vehicle.

Example 9 provides a method, system, and/or vehicle according to one or more of the preceding and/or following examples, further comprising receiving second map data for a second vehicle location and determining that there is metallic infrastructure in the second vehicle location.

Example 10 provides a method, system, and/or vehicle according to one or more of the preceding and/or following examples, further comprising determining that there are no metallic objects magnetically attached to the electromagnetic device, and, at the second vehicle location, deactivating the electromagnetic device.

Example 11 provides a method, system, and/or vehicle according to one or more of the preceding and/or following examples, further comprising: determining that there is a metallic item magnetically attached to the electromagnetic device; and at the second vehicle location, weakening a strength of the electromagnetic device to maintain a magnetic attachment with the metallic item, and prevent the electromagnetic device from attracting additional metallic objects from under the vehicle.

Example 12 provides a method, system, and/or vehicle according to one or more of the preceding and/or following examples, further comprising: determining that there is a metallic item magnetically attached to the electromagnetic device; and adjusting a vehicle route to avoid the second vehicle location.

Example 13 provides a method, system, and/or vehicle according to one or more of the preceding and/or following examples, wherein the electromagnetic device includes a first magnetic strip and a second magnetic strip, and further comprising: determining that there is a metallic item magnetically attached to the first magnetic strip; determining that there are no metallic objects magnetically attached to the second magnetic strip; and at the second vehicle location: deactivating the second magnetic strip, and weakening a strength of the first magnetic strip to maintain a magnetic attachment with the metallic item, and prevent the first magnetic strip from attracting additional metallic objects from under the vehicle.

Example 14 provides a method, system, and/or vehicle according to one or more of the preceding and/or following examples, wherein the electromagnetic device comprises a magnetic strip including a first electromagnet and a second electromagnet, and further comprising: determining that there is a metallic item magnetically attached to a first area of the magnetic strip; and at the second vehicle location: weakening a strength of the first electromagnet to maintain a magnetic attachment with the metallic item, and prevent the magnetic strip from attracting additional metallic objects from under the vehicle, wherein the first electromagnet provides magnetic strength to the first area of the magnetic strip; and deactivating the second electromagnet.

Example 15 provides a method, system, and/or vehicle according to one or more of the preceding and/or following examples, further comprising: determining a vehicle route, and identifying metallic infrastructure along the vehicle route.

Example 16 provides a vehicle for collecting metallic road debris, comprising: a magnetic strip positioned under a vehicle chassis, wherein: in a first mode, the magnetic strip is activated, in a second mode, the magnetic strip is deactivated, and wherein when the magnetic strip is in a first mode, the magnetic strip attracts metallic objects from under the vehicle; a sensor system to detect an item on the magnetic strip; and an onboard computer to control the magnetic strip, wherein the onboard computer is to activate and deactivate the magnetic strip.

Example 17 provides a method, system, and/or vehicle according to one or more of the preceding and/or following examples, wherein the onboard computer is to activate and deactivate the magnetic strip based on map data.

Example 18 provides a method, system, and/or vehicle according to one or more of the preceding and/or following examples, wherein the onboard computer is to activate and deactivate the magnetic strip based on vehicle speed.

Example 19 provides a method, system, and/or vehicle according to one or more of the preceding and/or following examples, wherein the first mode is a fully activated mode and wherein the magnetic strip is further to operate in a third mode, wherein in the third mode the magnetic strip is weakly activated, maintains attachment with magnetically attached metallic objects, and fails to attract additional metallic objects from under the vehicle.

Example 20 provides a method, system, and/or vehicle according to one or more of the preceding and/or following examples, wherein the magnetic strip includes a plurality of electromagnets for providing magnetic strength to a corresponding plurality of portions of the magnetic strip, and wherein the onboard computer is to activate and deactivate the portions of the magnetic strip by activating and deactivating corresponding electromagnets of the plurality of electromagnets.

Example 21 provides a vehicle for collecting metallic road debris, comprising: a magnetic strip positioned under a vehicle chassis, wherein the magnetic strip includes a plurality of electromagnets, and wherein: in a first mode, the magnetic strip is activated, in a second mode, the magnetic strip is deactivated, and wherein when the magnetic strip is in a first mode, the magnetic strip attracts metallic objects from under the vehicle; a sensor system to detect an item on the magnetic strip; and an onboard computer to control the magnetic strip, wherein the onboard computer is to activate and deactivate each of the plurality of electromagnets.

Example 22 includes an apparatus comprising means for performing the method of any of the examples 1-21.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for a vehicle to collect metallic road debris, comprising: an autonomous vehicle, including:
   a magnetic strip positioned under a vehicle chassis, wherein:
     in a first mode, the magnetic strip is activated, and
     in a second mode, the magnetic strip is deactivated;
   wherein when the magnetic strip is in a first mode, the magnetic strip attracts metallic objects from under the vehicle;
   a sensor system to detect an item on the magnetic strip; and
   an onboard computer configured to perform operations to control the magnetic strip, the operations comprising:
     determining that the vehicle speed is below a selected threshold;
     receiving first map data for a first vehicle location, wherein the onboard computer is to activate and deactivate the magnetic strip based on the first map data;
     determining if there is metallic infrastructure at the first vehicle location based on the first map data; and
     in response to determining that metallic infrastructure is not present at the first vehicle location, activating the magnetic strip to attract metallic objects from under the vehicle; and
   a central computing system to communicate the first map data to the onboard computer, wherein the first map data includes metallic infrastructure information.

2. The system of claim 1, wherein the onboard computer is to activate and deactivate the magnetic strip based on vehicle speed.

3. The system of claim 1, wherein the first mode is a fully activated mode and wherein the magnetic strip is further to operate in a third mode, wherein in the third mode the magnetic strip is weakly activated, maintains attachment with magnetically attached metallic objects, and fails to attract additional metallic objects from under the vehicle.

4. The system of claim 1, wherein the onboard computer is to receive detected item information from the sensor system.

5. The system of claim 4, wherein the magnetic strip includes a plurality of electromagnets for providing magnetic strength to a corresponding plurality of portions of the magnetic strip, and wherein the onboard computer is to activate and deactivate the portions of the magnetic strip by activating and deactivating corresponding electromagnets of the plurality of electromagnets.

6. The system of claim 1, wherein the autonomous vehicle further comprises a battery, wherein the magnetic strip includes an electromagnet, and wherein the battery provides power to the electromagnet in the first mode, when the magnetic strip is activated.

7. A method for an autonomous vehicle to collect metallic road debris, comprising:
   determining, by an onboard computer, that the autonomous vehicle speed is below a selected threshold;
   receiving, by the onboard computer, first map data for a first vehicle location, wherein the onboard computer is to activate and deactivate an electromagnetic device attached to the autonomous vehicle based on the first map data;
   determining, by the onboard computer, if there is metallic infrastructure at the first vehicle location based on the first map data; and
   in response to determining that metallic infrastructure is not present at the first vehicle location, activating the electromagnetic device attached to the autonomous vehicle to attract metallic objects from under the vehicle.

8. The method of claim 7, further comprising receiving second map data for a second vehicle location and determining that there is metallic infrastructure in the second vehicle location.

9. The method of claim 8, further comprising determining that there are no metallic objects magnetically attached to the electromagnetic device, and, at the second vehicle location, deactivating the electromagnetic device.

10. The method of claim 8, further comprising:
    determining that there is a metallic item magnetically attached to the electromagnetic device; and
    at the second vehicle location, weakening a strength of the electromagnetic device to maintain a magnetic attachment with the metallic item, and prevent the electromagnetic device from attracting additional metallic objects from under the vehicle.

11. The method of claim 8, further comprising:
determining that there is a metallic item magnetically attached to the electromagnetic device; and
adjusting a vehicle route to avoid the second vehicle location.

12. The method of claim 8, wherein the electromagnetic device includes a first magnetic strip and a second magnetic strip, and further comprising:
determining that there is a metallic item magnetically attached to the first magnetic strip;
determining that there are no metallic objects magnetically attached to the second magnetic strip; and
at the second vehicle location:
deactivating the second magnetic strip, and
weakening a strength of the first magnetic strip to maintain a magnetic attachment with the metallic item, and prevent the first magnetic strip from attracting additional metallic objects from under the vehicle.

13. The method of claim 8, wherein the electromagnetic device comprises a magnetic strip including a first electromagnet and a second electromagnet, and further comprising:
determining that there is a metallic item magnetically attached to a first area of the magnetic strip; and
at the second vehicle location:
weakening a strength of the first electromagnet to maintain a magnetic attachment with the metallic item, and prevent the magnetic strip from attracting additional metallic objects from under the vehicle, wherein the first electromagnet provides magnetic strength to the first area of the magnetic strip; and
deactivating the second electromagnet.

14. The method of claim 7, further comprising:
determining a vehicle route, and
identifying metallic infrastructure along the vehicle route.

15. A vehicle for collecting metallic road debris, comprising:
a magnetic strip positioned under a vehicle chassis, wherein the magnetic strip includes a plurality of electromagnets, and wherein:
in a first mode, the magnetic strip is activated,
in a second mode, the magnetic strip is deactivated, and
wherein when the magnetic strip is in a first mode, the magnetic strip attracts metallic objects from under the vehicle;
a sensor system to detect an item on the magnetic strip; and
an onboard computer configured to perform operations to control the magnetic strip, the operations comprising:
determining that the vehicle speed is below a selected threshold;
receiving first map data for a first vehicle location, wherein the onboard computer is to activate and deactivate each of the plurality of electromagnets based on the first map data;
determining if there is metallic infrastructure at the first vehicle location based on the first map data; and
in response to determining that metallic infrastructure is not present at the first vehicle location, activating the magnetic strip to attract metallic objects from under the vehicle.

16. The vehicle of claim 15, wherein the onboard computer is to activate and deactivate the magnetic strip based on vehicle speed.

17. The vehicle of claim 15, wherein the first mode is a fully activated mode and wherein the magnetic strip is further to operate in a third mode, wherein in the third mode the magnetic strip is weakly activated, maintains attachment with magnetically attached metallic objects, and fails to attract additional metallic objects from under the vehicle.

18. The vehicle of claim 15, wherein the plurality of electromagnets provide magnetic strength to a corresponding plurality of portions of the magnetic strip, and wherein the onboard computer is to activate and deactivate the portions of the magnetic strip by activating and deactivating corresponding electromagnets of the plurality of electromagnets.

* * * * *